(12) United States Patent
Schertler

(10) Patent No.: US 8,670,635 B2
(45) Date of Patent: Mar. 11, 2014

(54) METHOD AND DEVICE FOR DETERMINING THE POSITION, RADIUS AND/OR SHAPE DEVIATION OF A RING STRUCTURE

(75) Inventor: Klaus Schertler, Garching (DE)

(73) Assignee: EADS Deutschland GmbH, Ottobrunn (DE)

( * ) Notice: Subject to any disclaimer, the term of this patent is extended or adjusted under 35 U.S.C. 154(b) by 316 days.

(21) Appl. No.: 13/128,791

(22) PCT Filed: Nov. 9, 2009

(86) PCT No.: PCT/DE2009/001561
§ 371 (c)(1),
(2), (4) Date: Jun. 21, 2011

(87) PCT Pub. No.: WO2010/054625
PCT Pub. Date: May 20, 2010

(65) Prior Publication Data
US 2011/0262042 A1    Oct. 27, 2011

(30) Foreign Application Priority Data

Nov. 12, 2008  (DE) .......................... 10 2008 056 869

(51) Int. Cl.
*G06K 9/36*         (2006.01)
*G06K 9/40*         (2006.01)

(52) U.S. Cl.
USPC .......................................... 382/280; 382/274

(58) Field of Classification Search
USPC ......... 382/173, 197, 203, 280, 285, 286, 305, 382/312, 274; 342/351; 359/559, 577
See application file for complete search history.

(56) References Cited

U.S. PATENT DOCUMENTS 5,151,822 A * 9/1992  Hekker et al. ................. 359/559
5,159,474 A * 10/1992 Franke et al. .................... 359/29
5,613,013 A    3/1997  Schuette
7,376,075 B1 * 5/2008  Petranovich et al. ......... 370/208
7,460,063 B2 * 12/2008 De Maagt et al. ............ 342/351
7,969,650 B2 * 6/2011  Marks et al. .................. 359/368
8,355,591 B2 * 1/2013  Henrichs et al. .............. 382/244
2004/0027537 A1  2/2004  Sarver
2007/0171397 A1  7/2007  Halldorsson et al.

FOREIGN PATENT DOCUMENTS

DE    10 2006 030 399 B3    12/2007
WO    WO-2004/092767 A1     10/2004

OTHER PUBLICATIONS

International Search report of corresponding International Application No. PCT/DE2009/001561, dated Jul. 5, 2010.
Witten Opinion of the International Search Authority of corresponding International Application No. PCT/DE2009/001561, dated Jul. 5, 2010.

* cited by examiner

*Primary Examiner* — Kanjibhai Patel
(74) *Attorney, Agent, or Firm* — Global IP Counselors, LLP

(57) ABSTRACT

A system and method processes intensity images having a ring structure to measure position, shape deviation and/or radius of the ring structure, and to evaluate interferograms and/or localize objects. The system and method can define N sectors of the intensity image respectively having sector tips lying at a common sector origin within the ring structure, with N being a natural number where N>1, detect a distance of an intensity extreme from the respective sector tip of each sector of at least one group of the sectors to obtain a distance vector that includes the distances from all the sectors from at least the group of the sectors, perform a Fourier transformation of the distance vector, and determine a center, a radius and/or a deviation of the ring structure from a circular shape,-by using the first Fourier vector obtained by the Fourier transformation.

40 Claims, 4 Drawing Sheets

METHOD AND DEVICE FOR DETERMINING THE POSITION, RADIUS AND/OR SHAPE DEVIATION OF A RING STRUCTURE

CROSS-REFERENCE TO RELATED APPLICATIONS

This U.S. National stage application claims priority under 35 U.S.C. §119(a) to German Patent Application No. 10 2008 056 869.4, filed in Germany on Nov. 12, 2008, the entire contents of which are hereby incorporated herein by reference.

BACKGROUND

Field of the Invention

The invention relates to a method and a device for image processing of intensity images having a ring structure, in particular for processing interferograms.

The invention relates to a method and device for image processing of intensity images having a ring structure, and in particular, a method and device for processing interferograms. More particularly, the present invention relates to an image processing method and apparatus that can draw inferences relating to extremely small changes in wavelength by accurate measurement of ring radii in interferograms.

Background Information

This invention concerns itself with the same basic formulation of the problem as do the method and the device that are disclosed in DE 10 2006 030 399 B3. One of the aims is, for example, to draw inferences relating to extremely small changes in wavelength by accurate measurement of ring radii in interferograms.

Various spectroscopic measurement methods are known in which, for example, minimal changes in length or wavelength are determined quantitatively by evaluating interferograms produced by using an optical radiation. By way of example, such interferograms exhibit annularly arranged intensity extremes, for example intensity maxima and intensity minima of Fabry-Perot interference images.

DE 10 2006 030 399 B3 discloses a method and a device that enable a quick evaluation of such intensity images having ring structures. By way of example, it is thereby possible on board aircraft to quickly acquire gusts acting on the aircraft. The known method and the known device can be used to measure an interferogram in such a way that the position of the intensity extremes can be acquired quickly and accurately. In particular, this method may be used to determine a ring radius of an annular intensity extreme in an interferogram.

A disadvantage of the method known from DE 10 2006 030 399 B3 consists in that the position of the ring center (center) must be known in advance in order to determine the ring radii. However, the position of the ring center is generally not known, or known only insufficiently accurately (for example owing to drift of the ring center after calibration). A further disadvantage of the methodology described in DE 10 2006 030 399 B3 consists in that a slight ellipticity that may be present (for example owing to decalibrated optics) in the ring patterns of the interference image is not acquired, and therefore does not very efficiently contribute to the method (for example in a fashion so as to correct the determination of the ring radii or at the start of a new calibration). Deviations in the position of the ring center or in the shape of the ring structure from a circular shape can lead to inaccuracies with the known method. In other words, the known method operates with the desired precision only under certain circumstances.

SUMMARY

It is an object of the invention to improve a method and a device for image processing of intensity images having a ring structure for the purpose of measuring the position and/or the radius of the ring structure in such a way that they operate more accurately and can be used more universally.

The invention provides a method for image processing of intensity images having a ring structure for the purpose of measuring position, shape deviation and/or radius of the ring structure, in particular for evaluating interferograms and/or for exact localization of objects, having the steps of:

a) defining N sectors of the intensity image respectively having sector tips lying at a common sector origin within the ring structure, N being a natural number with N>1;
b) detecting a distance of an intensity extreme from the respective sector tip of each sector of at least one group of the sectors, in order to obtain a distance vector that includes the distances from all the sectors from at least the group of the sectors;
c) carrying out a Fourier transformation of the distance vector; and
d) determining
   d1) a center of the ring structure and/or
   d2) a radius of the ring structure and/or
   d3) a deviation of the ring structure from a circular shape,
   by using the Fourier vector obtained by the Fourier transformation.

In accordance with a preferred use, it is possible with the aid of this inventive method in particular even to solve the problem of the quick and accurate algorithmic acquisition of ring radii in Fabry-Perot interferograms given an inaccurately known ring center and a possibly present unknown ring ellipticity.

Furthermore, simultaneous determination of ring radius, ring center and ring ellipticity of ring structures in intensity images is rendered possible within a standard methodology.

A method and a device for simultaneous acquisition of ring centers, ring radii and ring ellipticities can be provided with the aid of the inventive method and of the inventive device for carrying out the method.

Consequently, it is also rendered possible in general to measure the ring structures more accurately, since deviations in the position of the ring center and/or shape deviations of the ring structure from an ideal circular shape can be acquired, and can thereby also be corrected when measuring the position and/or the radius of the ring structure.

To this end, a first step is to define a plurality of sectors in the intensity image that respectively have the same sector origin. For example, the intensity image is divided up into a plurality of sectors. However, it is also possible to conceive overlapping sectors or sectors spaced apart from one another in a peripheral direction.

The position of an intensity extreme relative to the respective sector tip is then acquired for each or one group of the sectors. In general, the method for acquiring the position of intensity extremes can be applied to this end, as is described in DE 10 2006 030 399 B3, to which express reference is made for further details. However, it is also possible to use other methods for acquiring the position of intensity extremes.

Subsequently, a Fourier transformation is carried out on the distance vector thus obtained, which includes as components the individual distances of the intensity extremes in the individual sectors in relation to the respective sector tip.

The Fourier vector obtained by the Fourier transformation can then be used to determine the position of the ring center and/or to determine a shape deviation, in particular an ellipticity, and/or to determine the ring radius. This Fourier vector, that is obtained from the distance vector by Fourier transformation, is here denoted as "first Fourier vector", while the Fourier vector that is obtained from a 1D intensity vector upon carrying out the method in accordance with DE 10 2006 030 399 B3 and is used in an advantageous refinement of the invention to determine the position of the intensity extreme of the respective sector tip, is denoted as "second Fourier vector".

In accordance with an advantageous refinement of the invention, step a) comprises:

a1) dividing up a given intensity image, in particular an interferogram image, into N radial image sectors, and/or a2) consecutively allocating adjacent sectors a consecutive sector number n, where n=0...N−1, and/or in the case of an inexactly known center of the ring structure:

a3) defining an approximate ring center as a common sector origin ($cx_0$, $cy_0$) of the radial sectors, which forms the respective sector tips.

As a result of dividing the image up into radial image sectors use is made of all the image information, and this contributes to increasing the accuracy.

Owing to the allocation of sector numbers, it is possible to facilitate the assignment in the calculation; moreover, the position of the sectors relative to one another can thus be detected.

The definition of an approximate ring center yields a starting point for the method that can be corrected after the method has been carried out in accordance with the established position of the ring center.

As is known in principle from DE 10 2006 030 399 B3, the approach to determine the distance in step b) is preferably to carry out the following substeps:

b1) generating a 1-dimensional intensity vector from the 2-dimensional interferogram of the respective sector by 2D-1D transformation, which is selected in such a way that intensity extremes present in the 2-dimensional interferogram appear equidistant in the 1-dimensional intensity vector;

b2) carrying out a Fourier transformation on the 1-dimensional intensity vector;

b3) determining the frequency position and/or phase angle of the dominant frequency from the second Fourier vector obtained by the Fourier transformation of the 1-dimensional intensity vector, and b4) determining the distance of the respective intensity extreme from the sector tip in the sector by backcalculation of the frequency position and the phase angle of the dominant frequency of the frequency domain in the spatial domain.

This has the advantages, described in DE 10 2006 030 399 B3, of a quick and accurate determination of position, and thus determination of distance, which can be carried out easily with standard hardware (or with software programmed using standard methods).

In accordance with an advantageous refinement of the invention, it is provided that step c) comprises:
converting the distance vector $D=(d_0, d_1, \ldots, d_{N-1})$ by discrete Fourier transformation into a complex Fourier vector $V=(v_0, v_1, \ldots, v_{N-1})$, the values of the Fourier vector resulting from the values of the distance vector by the definition of the discrete Fourier transform as:

$$v_k = \frac{1}{N}\sum_{n=0}^{N-1} d_n e^{-i2\pi k \frac{n}{N}} \text{ where } k = 0 \ldots N-1,$$

N representing the number of the sectors.

The position of the ring center is preferably determined from the component $v_1$ of the first Fourier vector thus determined.

In a particularly preferred refinement, the coordinates cx, cy of the ring center are determined by:

$cx = cx_0 + 2\, Re(v_1)$ and $cy = cy_0 + 2\, Im(v_1)$, where
$cx_0$, $cy_0$ represent coordinates of a common sector origin defined in step a),
$Re(v_1)$ represents the real part of the complex number $v_1$, and $Im(v_1)$ represents the imaginary part of the complex number $v_1$.

Furthermore, it is preferred to determine a ring radius of the ring structure from the Fourier vector component $v_0$, or from the Fourier vector component $v_0$ and at least one of the Fourier vector components $v_1$ and $v_2$.

In accordance with a preferred refinement, it is provided in this case that a mean radius is determined from the absolute value $|v_0|$ of the Fourier vector component $v_0$, and is corrected by at least one of the further Fourier vector components.

In a preferred procedure, the radius of the ring structure is calculated from the Fourier vector components $v_0$, $v_1$ and $v_2$:

$$R(v_0, v_1, v_2) = |v_0| \cdot \left(1 + \left(\frac{|v_1|}{|v_0|}\right)^2 + \left(\frac{|v_2|}{|v_0|}\right)^2\right).$$

It is preferred to determine an ellipticity of the ring structure from at least one component of the first Fourier vector as a measure of a shape deviation from a circular shape.

In particular, it is preferred that the ellipticity is calculated from the Fourier vector component $v_2$ and, in particular, calculated in the form of the numerical ellipticity $\epsilon$ by $$\varepsilon = 2\sqrt{2\frac{|v_2|}{|v_0|}}.$$

A preferred field of use of the method described here is the measurement and/or calculation of ring radii, ring centers and/or ring ellipticities in Fabry-Perot interferometers. It is preferred to provide the same uses as in DE 10 2006 030 399 B3.

It is particularly preferred to use the method in methods and devices for acquiring gusts such as are described more precisely in WO 2004/092767 A1.

A preferred refinement of the invention is characterized by single or multiple repetition of steps a) to d1), a ring center respectively determined in the previous pass in step d1) being defined in the next pass as common sector origin for the sectors. The ring center can be determined more accurately by multiple repetition, and so the accuracy is increased overall.

Instead of dividing up the intensity image into sectors, it is also possible to define mutually overlapping sectors for the purpose of carrying out the method in step a).

By way of example, it is possible through overlapping also to ensure given a coarse sector distribution that all the information from the intensity image is used for the calculation, and this increases the accuracy.

The method can be carried out particularly quickly when the distance is acquired in accordance with step b) in a plurality of sectors at the same time.

Again, the averaging of intensity values along circular contours that is described in DE 10 2006 030 399 B3 and can be carried out, for example, to determine the position of the intensity extremes can be used and carried out more accurately by using the results of the inventive method, in order thus to increase the accuracy further overall. Consequently, it is provided in a preferred refinement of the invention that step b) comprises:

b0) averaging intensity values acquired along a specific circular contour with a prescribed radius $R_L$ or a specific elliptical contour with prescribed ellipse semi-axis lengths. In this case, it is preferred that when steps a) to d) are carried out multiply a position and shape, in particular ellipticity, of the ring structure that were acquired in a pass of the steps a) to d) that was previously carried out are used in step b0) as starting point for averaging along the correct circular or elliptical contour in a pass following thereupon.

Again, a simple and accurate calibration of an image processing device used, for example, for carrying out the method can advantageously be carried out using the method. To this end, it is provided in accordance with a preferred refinement that the information obtained in step d), in particular the position of the ring center and/or ellipticity of the ring structure, is used to calibrate an image processing device.

By way of example, the method can be carried out:

to acquire change in length or wavelength, on board an aircraft to acquire gusts, or to determine the change in position of objects that are provided with a ring pattern, the ring pattern being recorded as an image and being subjected to corresponding image processing in order to acquire the position of the ring pattern, and thus the position of the object.

The inventive device is, in particular, preferably designed for carrying out the inventive method.

In accordance with a further aspect, the invention consequently provides a device for image processing of intensity images having a ring structure for the purpose of measuring position, shape deviation and/or radius of the ring structure, in particular for processing interferograms and/or for exact localization of objects, comprising:

a sector forming unit for defining N sectors of the intensity image respectively having sector tips lying at a common sector origin within the ring structure, N being a natural number where N>1;

a distance acquiring unit for acquiring a distance of an intensity extreme from the respective sector tip of each sector of at least one group of the sectors, in order to obtain a distance vector that includes the distances from all the sectors from at least the group of the sectors;

a first Fourier transformation unit for carrying out a Fourier transformation of the distance vector in order thus to obtain a first Fourier vector; and at least one of the following units:

a center acquiring unit for determining a center of the ring structure from the first Fourier vector obtained by the Fourier transformation, and/or a radius acquiring unit for determining a radius of the ring structure from the first Fourier vector obtained by the Fourier transformation, and/or a shape deviation acquiring unit for acquiring a deviation of the ring structure from a circular shape from the first Fourier vector acquired by the Fourier transformation.

The sector forming unit preferably comprises at least one of the following units:

a dividing unit for dividing up a given intensity image, in particular an interferogram image, into N radial image sectors, and/or an allocating unit for consecutively allocating a consecutive sector number n, where n=0. . . N−1, to adjacent sectors, and/or a ring center selecting unit for defining an approximate ring center as a common sector origin ($cx_0$, $cy_0$) of the radial sectors, which forms the respective sector tips when the center of the ring structure is not exactly known.

The distance acquiring unit preferably has the following units: an intensity vector generating unit for generating a 1-dimensional intensity vector from the 2-dimensional interferogram of the respective sector by 2D-1D transformation, which is selected in such a way that intensity extremes present in the 2-dimensional interferogram appear equidistant in the 1-dimensional intensity vector;

a second Fourier transformation unit for carrying out a Fourier transformation on the 1-dimensional intensity vector in order thus to generate a second Fourier vector;

a frequency position and/or phase angle determining unit for determining frequency position and/or phase angle of the dominant frequency from the second Fourier vector obtained by the Fourier transformation of the 1-dimensional intensity vector, and a distance determining unit for determining the distance of the respective intensity extreme from the sector tip in the sector by backcalculation of the frequency position and the phase angle of the dominant frequency of the frequency domain in the spatial domain.

The first Fourier transformation unit is preferably designed to convert the distance vector $D=(d_0, d_1, \ldots, d_{N-1})$ by discrete Fourier transformation into a complex Fourier vector $V=(v_0, v_1, \ldots, v_{N-1})$, the values of the Fourier vector resulting from the values of the distance vector by the definition of the discrete Fourier transform as:

$$v_k = \frac{1}{N}\sum_{n=0}^{N-1} d_n e^{-i2\pi k \frac{n}{N}} \text{ where } k = 0 \ldots N-1,$$

N representing the number of the sectors.

The center acquiring unit is preferably designed to determine the position of the ring center from the component $v_1$ of the first Fourier vector.

The center acquiring unit is preferably designed to determine the coordinates cx, cy of the ring center by:

$$cx = cx_0 + 2Re(v_1) \text{ and}$$

$$cy = cy_0 + 2Im(v_1)$$

where $cx_0$, $cy_0$ represent coordinates of the common sector origin, $Re(v_1)$ represents the real part of the complex number $v_1$, and $Im(v_1)$ represents the imaginary part of the complex number $v_1$.

The radius acquiring unit is preferably designed to determine a ring radius of the ring structure from the Fourier vector component $v_0$, or from the Fourier vector component $v_0$ and at least one of the Fourier vector components $v_1$ and $v_2$.

The radius acquiring unit is preferably designed to determine a mean radius from the absolute value $|v_0|$ of the Fourier vector component $v_0$, and to determine the radius by correcting the mean radius by at least one of the further Fourier vector components.

The radius acquiring unit is preferably designed to calculate the radius of the ring structure from the Fourier vector components $v_0$, $v_1$ and $v_2$ by:

$$R(v_0, v_1, v_2) = |v_0| \cdot \left(1 + \left(\frac{|v_1|}{|v_0|}\right)^2 + \left(\frac{|v_2|}{|v_0|}\right)^2\right).$$

The shape deviation acquiring unit is preferably designed to determine an ellipticity of the ring structure from at least one component of the first Fourier vector.

The shape deviation acquiring unit is preferably designed to calculate the ellipticity from the Fourier vector component $v_2$ and, in particular, to calculate a numerical ellipticity $\epsilon$ by $$\varepsilon = 2\sqrt{2\frac{|v_2|}{|v_0|}}.$$

The device is preferably designed to calculate ring radii, ring centers and/or ring ellipticities in Fabry-Perot interferometers.

The device is preferably designed for single or multiple repetition of a determination of a ring center of the ring structure, the sector forming unit being designed to define the sectors in such a way that a ring center respectively determined in the previous pass is used in the next pass as common sector origin for the sectors.

The sector forming unit can be designed to define mutually overlapping sectors.

A plurality of distance acquiring units can be provided in order to simultaneously acquire the distance of an intensity extreme from the respective sector tip in a plurality of sectors. Step b), and thus the method overall, can thereby be carried out more quickly.

The distance acquiring unit can have an averaging unit that averages intensity values acquired along a specific circular contour with a prescribed radius $R_L$ or specific elliptical contour with the prescribed ellipse semi-axis lengths.

The device can be designed for single or multiple repetition of a determination of a ring center of the ring structure, and of a deviation of the ring structure from a circular shape, in particular for determining an ellipticity of the ring structure, the averaging unit being able to be designed in such a way that a position and shape, in particular ellipticity, of the ring structure acquired in a pass of steps a) to d) that was previously carried out are used as a starting point for averaging along the correct circular or elliptical contour in a pass following thereupon.

It is possible to provide a calibration unit for calibrating the device on the basis of initial values of the center acquiring unit, the radius acquiring unit and/or the shape deviation acquiring unit.

The device can be designed
to acquire change in length or wavelength,
on board an aircraft to acquire gusts, or
to determine the change in position of objects that are provided with a ring pattern, the ring pattern being recorded as an image and being subjected to corresponding image processing in order to acquire the position of the ring pattern, and thus the position of the object.

The device is preferably designed, in particular, for use in methods and devices as described in WO2004/092767 A1. Reference is made expressly to this publication for further details.

BRIEF DESCRIPTION OF THE DRAWINGS

Exemplary embodiments of the invention are explained in more detail below with the aid of the attached drawing, in which.

DETAILED DESCRIPTION OF EMBODIMENTS

WO2004/092767 A1, to which reference is made for further details, describes and shows a device and a method by means of which it is possible to acquire from an aircraft gusts that affect the aircraft. One aim is to provide a system with which such gusts can be automatically counteracted. The gusts must be acquired quickly for this purpose. In accordance with WO2004/092767 A1, a laser Doppler system is used to produce interferograms, in particular Fabry-Perot interferograms, and these interferograms are recorded by means of photodetectors, and the recorded intensity images are subjected to image processing in order, in particular, to measure the radii of ring structures in the interferograms. By measuring changes, it is possible to this end to draw conclusions relating to changes in speed of the observed medium. In particular, it is possible hereby to detect gusts.

A quick measurement of the ring radii when processing the images is desirable to this end. A method and a device for quickly measuring ring radii of corresponding interferograms is described in DE 10 2006 030 399 B3 to which reference is expressly made for further details. To acquire the ring radii accurately, however, the approach here should proceed as accurately as possible from the ring center of the ring structure. However, the exact position of the ring radii is often unknown. Again, the ring structures can have deviations from the ideal circular shape, and these can likewise lead to inaccuracies in the measurement.

What are described below are exemplary embodiments of a method and a device with the aid of which it is possible to acquire the exact position of the ring center of the ring structure, as well as shape deviations and an accurate ring radius of the ring structure.

The method can be divided up into five method steps. Ring radius, ring center and ring ellipticity are determined at the end of these method steps in relation to a given interferogram image.

First Step a): Division of the Image into Radial Image Sectors:

In the first step—step a)—a given interferogram image is divided up into N radial image segments—here: radial image sectors. The sectors are allocated a consecutive sector number n, where n=0...N−1. Where the ring center is unknown, an approximate ring center is defined as sector origin ($cx_0$, $cy_0$) of the radial sectors.

Figure 1:
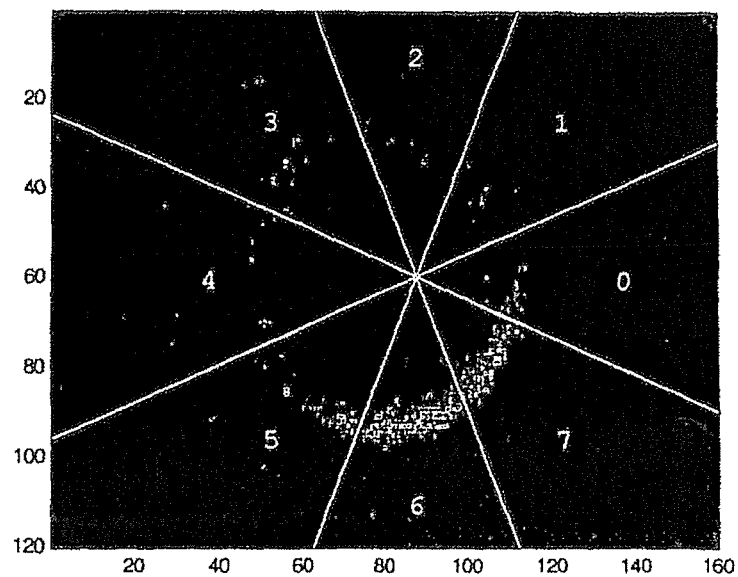
FIG. 1 shows a Fabry-Perot interferogram in which are drawn N=8 radial image segments—in particular image sectors—starting from an approximately defined ring center ($cx_0$, $cy_0$) as segment origin or sector origin.

An exemplary embodiment of the first step a) is shown in FIG. 1. By way of example for an intensity image to be processed, FIG. 1 shows a Fabry-Perot interferogram with N=8 radial image sectors drawn in and starting from an approximately defined ring center ($cx_0$, $cy_0$) as sector origin. All eight sectors proceed from the same sector origin $cx_0$, $cy_0$.

The sector origin lies within the ring structure formed by the first intensity maximum. However, in the example shown in FIG. 1 the sector origin does not coincide with the ring center of the ring structure.

The eight sectors are allocated the respective sector numbers n=0 to n=7.

Second Step b): Determination of the Radial Distances

In a second step b), the method described in DE 2006 030 399 B3 for determining the position of an intensity extreme is applied to each individual one of the N image sectors, thus yielding a radial distance $d_n$ from the sector origin to the first intensity maximum in the segment n. This defines the distance vector $D=(d_0, d_1, \ldots, d_{N-1})$.

Reference is made to the full compass of DE 2006 030 399 B3 for further details on the method of determining distance. In brief summary, a 1D intensity vector is generated from a 2D image in accordance with the method described in DE 2006 030 399 B3, for example by averaging the intensity along a circular contour in relation to a respectively provided radius, the 1D intensity vector including the mean values for various radii. Subsequently, a Fourier transformation is carried out, the 1D intensity vector thereby being transformed into a second Fourier vector. This second Fourier vector is used to determine the frequency position and phase angle of the dominant frequency, which corresponds to the position of the equidistant intensity extremes.

Figure 2:
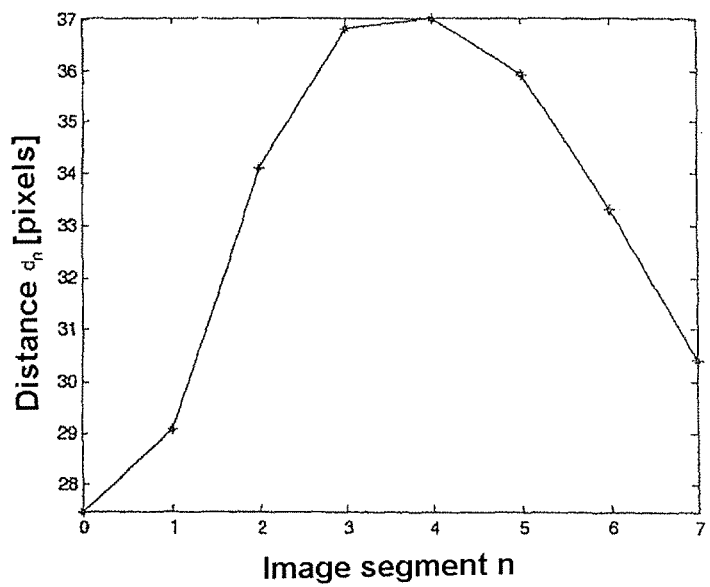
FIG. 2 shows a graph that illustrates the distance from the segment origin or sector origin to the first intensity maximum for each of the image segments-image sectors.

An exemplary illustration of the distance vector D generated from the intensity image of FIG. 1 is shown in FIG. 2. FIG. 2 shows a graph of the distance from the segment origin to the first intensity maximum for each of the eight image sectors with n=0 to n=7.

Third Step c): Fourier Transformation of the Radial Distances

In a third step c), the distance vector $D=(d_0, d_1, \ldots, d_{N-1})$ is converted into a complex first Fourier vector $V=(v_0, v_1, \ldots, v_{N-1})$ by discrete Fourier transformation. The value of the first Fourier vector are yielded from the values of the distance vector by the definition of the discrete Fourier transformation as:

$$v_k = \frac{1}{N}\sum_{n=0}^{N-1} d_n e^{-i2\pi k \frac{n}{N}} \quad (k = 0 \ldots N-1). \tag{1}$$

Fourth Step d1): Determination of the Ring Center from the Fourier Vector

In a fourth step d1), the Fourier vector component $v_1$ obtained in the third step c) is used to determine the ring center being sought.

An exemplary embodiment of the fourth step d1) for calculating the ring center (cx,cy) being sought is given by:

$cx = cx_0 + 2Re(v_1)$ and $cy = cy_0 + 2Im(v_1)$,

Here, ($cx_0$, $cy_0$) is the sector origin defined in the first step a). $Re(v_1)$ is the real part, and $Im(v_1)$ is the imaginary part of the complex number $v_1$.

Explanation: if the sector origin does not lie exactly at the ring center of the interferogram, as a function of n the distance $d_0$ behaves like a harmonic oscillation—see FIG. 2. With reference to the angular alignment of the image sectors, the harmonic oscillation has a period of 27c. This period corresponds to the element $v_1$ of the first Fourier vector. If $v_1$ is plotted as vector in the complex number plane (Gaussian plane), $v_1$ points in the direction of the ring center. Double the absolute value $|v_1|$ of the vector $v_1$ corresponds to the distance between the sector origin and ring center. Consequently, the sector origin can be corrected directly with the aid of the real and imaginary parts of $v_1$.

Fifth Step: Determination of Ring Radius and Ring Ellipticity from the Fourier Vector In a fifth step—for example, in two partial steps d2) and d3)—the components of the first Fourier vector are used to determine the ring radius—radius of the innermost ring, step d2)—and the ring ellipticity—shape deviation from the ideal circular shape, step d2). In this case, the Fourier vector components $v_0$, $v_1$ and $v_2$ of the first Fourier vector are used. The ring radius R being sought can then be represented as a function $R=R(v_0, v_1, v_2)$ (see exemplary embodiment). The dependencies of the ring radius R being sought on $v_0$, $v_1$ and $v_2$ are yielded as follows.

The mean radius $v_0$:

The Fourier vector component $v_0$ approximates to the ring radius being sought as mean ring radius by averaging the radial distances. As can be seen from equation (1) by using k=0, this is given by $v_0$:

$$|v_0| = \frac{1}{N}\sum_{n=0}^{N-1} d_n \quad \text{(mean ring radius)}.$$

The mean ring radius $|v_0|$ corresponds to the ring radius being sought only under the condition that the sector origin lie at the correct ring center (no center offset), and that no ring ellipticities be present. In general, it follows that the mean radius $|v_0|$ should be corrected. This is done by the Fourier vector components $v_1$ and $v_2$.

Radius correction by $v_1$:

The greater the distance of the selected sector origin from the true ring center, the stronger is the spectral component with period $2\pi$ in the distance vector D. The reason for this is that, as a function of the sector angle, the distance has exactly one maximum and one minimum (see FIG. 3). The Fourier vector component corresponding to the period of $2\pi$ is $v_1$.

Consequently, $|v_1|$ is a measure of the center offset and can be used to correct the mean radius.

Figure 3:
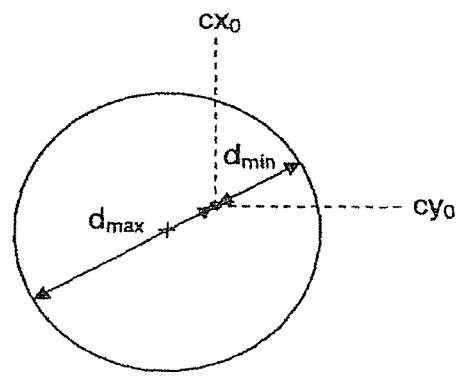
FIG. 3 shows a symbolic illustration of a maximum distance $d_{max}$ and minimum distance $d_{min}$ in the presence of a center offset; the distance therefore has the period $2\pi$ as a function of the segment angle or sector angle.

FIG. 3 shows a symbolic representation of the maximum distance $d_{max}$ and minimum distance $d_{min}$ given an existing center offset. The distance therefore has a function of the sector angle the period $2\pi$.

Radius correction by $v_2$:

The stronger the ellipticity of the interference rings, the stronger is the spectral component with period $\pi$ in the distance vector D. The reason for this is that the distance from an elliptical contour has exactly two maxima (corresponding to the semimajor axes) and two minima (corresponding to the semiminor axes)—that is to say two oscillation cycles per sector circuit. The Fourier vector component corresponding to this period is $v_2$. Consequently, the absolute value $|v_2|$ of this component is a measure of the ellipticity of the interference rings and can be used to correct the mean radius.

Figure 4:
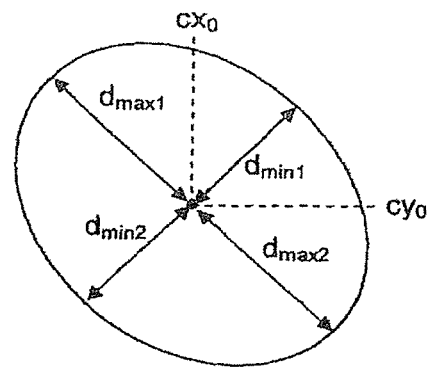
FIG. 4 shows a symbolic illustration of the two maximum distances $d_{max1}$, $d_{max2}$ and of the two minimum distances $d_{min1}$, $d_{min2}$ in the presence of ellipticity and vanishing center offset; the distance therefore has the period $\pi$ as a function of the segment angle or sector angle.

FIG. 4 shows a symbolic illustration of the two maximum distances $d_{max1}$ $d_{max2}$ and of the two minimum distances $d_{min1}$, $d_{min2}$ given an existing ellipticity and vanishing center offset. As a function of the sector angle, the distance therefore has the period $\pi$.

Exemplary Embodiments

An exemplary embodiment for the calculation of the radius R is given by:

$$R(v_0, v_1, v_2) = |v_0| \cdot \left(1 + \left(\frac{|v_1|}{|v_0|}\right)^2 + \left(\frac{|v_2|}{|v_0|}\right)^2\right).$$

The mean radius $|v_0|$ is yielded, in turn, as the radius being sought at the limiting value of a vanishing center offset ($|v_1|=0$) and of a vanishing ellipticity ($|v_2|=0$).

An exemplary embodiment for the calculation of the ring ellipticity (in the form of the so-called numerical eccentricity $\epsilon$ of the ellipse) is given by:

$$\varepsilon = 2\sqrt{2\frac{|v_2|}{|v_0|}}.$$

Figure 5:
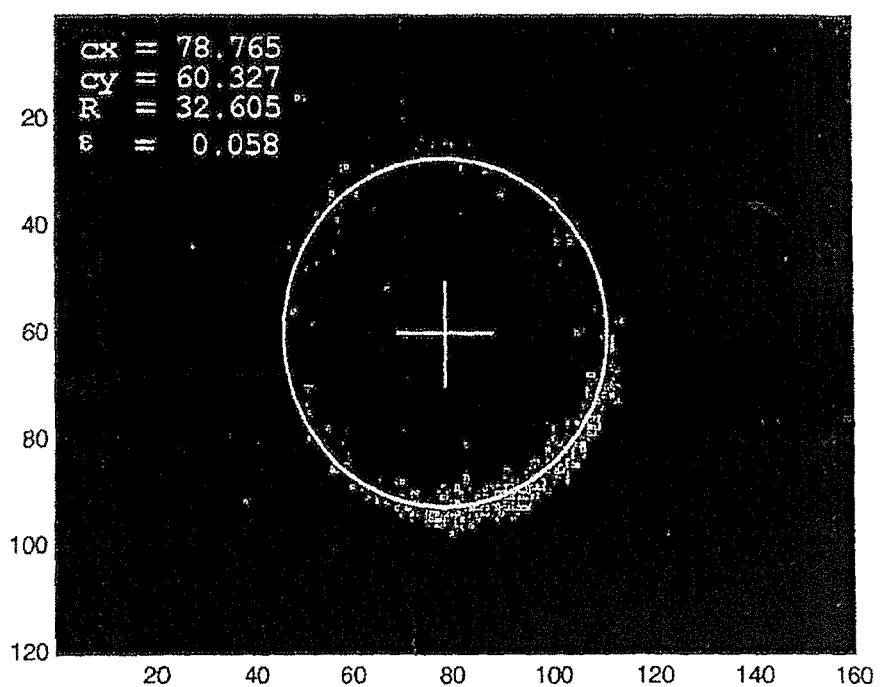
FIG. 5 shows an example of a Fabry-Perot interferogram with the variables of ring center, ring radius and ring ellipticity, determined by the method described here.

FIG. 5 shows one result of the application of the methodology to the interferogram from FIG. 1. FIG. 5 shows the Fabry-Perot interferogram with the variables of ring center, ring radius and ring ellipticity determined by the method.

The method described here has the following advantages in particular. One substantial advantage of the method consists in that ring radii in Fabry-Perot interferograms themselves can be determined very efficiently and accurately algorithmically given a ring center known only inaccurately and a ring ellipticity that may be present.

The method additionally uses a uniform methodology (measurement procedure) for determining ring radius, ring center and ring ellipticity. This prevents disturbing systematic effects that can arise when use is made of different measurement procedures to determine these variables.

The method makes use exclusively of algorithmic components that can be executed very quickly (in real time) in the hardware implementations.

Device for Carrying Out the Method:

A device for carrying out the method has units that are appropriately designed to carry out the individual steps and partial steps. These units can be implemented in terms of the software or hardware.

Figure 6:
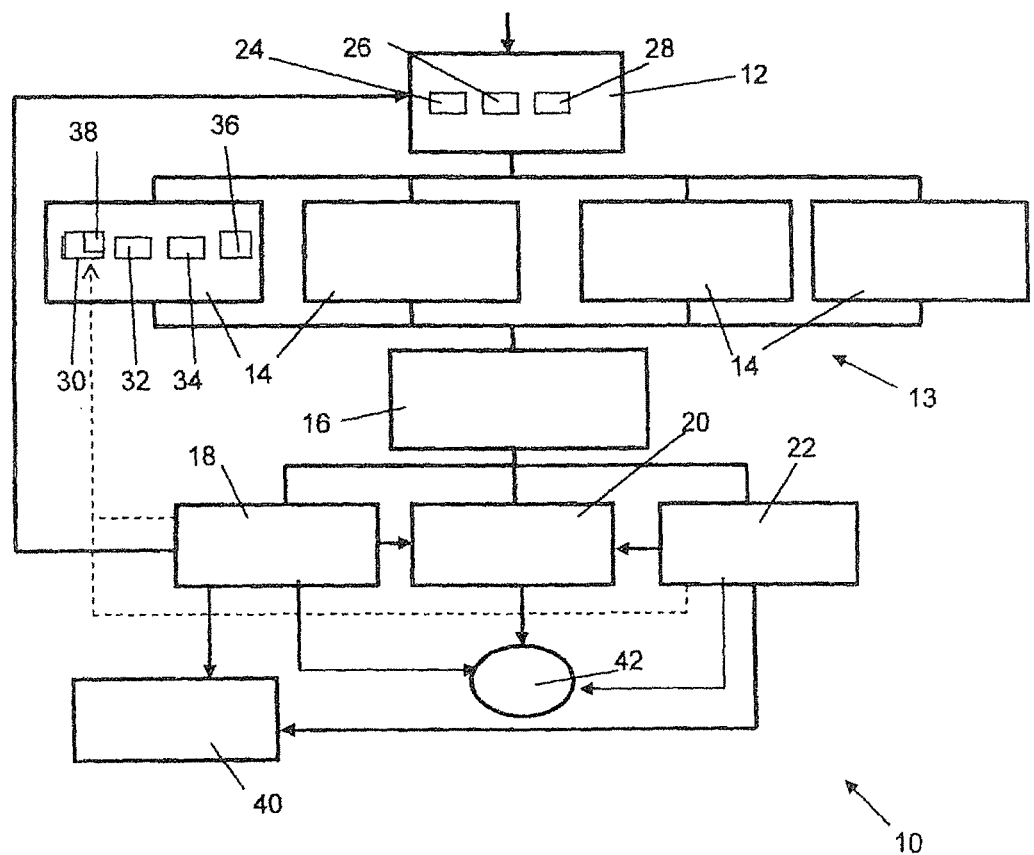
FIG. 6 shows a block diagram of an exemplary embodiment of a device for image processing for interferograms illustrated by way of example in FIG. 1.

One exemplary embodiment of such a device is illustrated schematically in FIG. 6. FIG. 6 shows a block diagram of a device 10 for image processing of intensity images having a ring structure. The device 10 is designed for such image processing in that the position, shape deviation and/or radius of the ring structure can be measured. In particular, the device 10 is designed to evaluate interferograms and/or to determine the location of objects accurately. By way of example, what is input to this end is a digitized intensity image of an interferogram (as illustrated in FIG. 1, for example) recorded by means of a photodetector or a camera.

The device 10 has a sector forming unit 12, a distance vector forming unit 13 with a plurality of distance acquiring units 14, a first Fourier transformation unit 16, a center acquiring unit 18, a radius acquiring unit 20 and a shape deviation acquiring unit 22.

The sector forming unit 12 defines the N sectors of the intensity image respectively having sector tips at the common sector origin, preferably within the ring structure. To this end, the sector forming unit 12 has a ring center selecting unit 24, a dividing unit 26 and an allocating unit 28.

The ring center selecting unit defines a ring center as a common sector origin ($cx_0$, $cy_0$) of the radial sectors that forms the respective sector tips. To this end, an approximate ring center is defined when the center of the ring structure is not accurately known. Suitable for this purpose are, in particular, points that are highly likely to lie within the ring structure. For example, at the beginning a start is made with a pixel lying in the middle of the image. On the other hand, if the device has already been used in advance to carry out the method, a ring center acquired in a previous pass by means of the center acquiring unit 18 is defined as approximate ring center $cx_0$, $cy_0$. This is indicated in FIG. 6 by a connecting arrow between the center acquiring unit 18 and the ring center selecting unit 24.

Proceeding from the approximate ring center defined by the ring center selecting unit 24, the dividing unit divides the input intensity image into the N radial image sectors as illustrated in FIG. 1. The allocating unit 28 is used for consecutively allocating the consecutive sector number n, where n=0...N−1, to the respective adjacent sectors, as may likewise be seen from FIG. 1.

Each distance acquiring unit 14 serves to acquire the distance of an intensity extreme in relation to the respective sector tip of a sector. The plurality of distance acquiring units in this case acquire such a distance simultaneously in a plurality of the sectors. The distance vector forming unit 13 then forms the distance vector for each of the sectors n=0 to n=N−1 from the result of the distance acquisition.

The first Fourier transformation unit 16 serves to carry out a Fourier transformation of the distance vector in order thus to obtain the first Fourier vector.

The center acquiring unit 18 serves to determine the ring center of the ring structure from the first Fourier vector obtained by the Fourier transformation. The radius acquiring unit 20 determines the radius of the ring structure from the first Fourier vector obtained by the Fourier transformation. The shape deviation acquiring unit acquires a deviation of the ring structure from a circular shape by acquiring an ellipticity of the ring structure from the first Fourier vector obtained by the Fourier transformation.

As indicated in FIG. 6 for only one of the distance acquiring units, each distance acquiring unit 14 has an intensity vector generating unit 30, a second Fourier transformation unit 32, a frequency position and/or phase angle determining unit 34 and a distance determining unit 36. Reference may be made to DE 10 2006 030 399 B3 for greater detail relating to the distance acquiring unit 14 and its units 30, 32, 34 and 36. As is evident from this publication, the identity vector generating unit 30 serves to generate the 1-dimensional intensity vector from the 2-dimensional interferogram of the respective sector by 2D-1D transformation, which is selected in such a way that intensity extremes present in the 2-dimensional interferogram appear equidistant in the 1-dimensional intensity vector. The second Fourier transformation unit 32 serves to carry out the Fourier transformation on the 1-dimensional intensity vector in order thus to generate the second Fourier vector. The frequency position and/or phase angle determining unit 34 serves to determine the frequency position and/or phase angle of the dominant frequency from the second Fourier vector obtained by the Fourier transformation of the 1-dimensional intensity vector. Also, the distance determining unit 36 serves to determine the distance of the respective intensity extreme from the sector tip in the sector by backcalculation of the frequency position and the phase angle of the dominant frequency of the frequency domain in the spatial domain.

The intensity vector generating unit 30 has an averaging unit 38 that, as is described in more detail in DE 10 2006 030 399 B3, averages intensity values acquired along a specific circular contour with a prescribed radius $R_L$ in order to carry out the 2D-1D transformation. The device 10 is designed for the single or multiple repetition of a determination of the ring center of the ring structure, and of the deviation of the ring structure from a circular shape by determining an ellipticity of the ring structure. The averaging unit 38 is designed in such a way in this case that a position and shape (in particular ellipticity), acquired in a pass of the method carried out in advance, of the ring structure are used as starting point for averaging along the correct circular or elliptical contour in a pass following thereupon. This is illustrated in FIG. 6 by a connecting arrow between the center acquiring unit 18 and the shape deviation acquiring unit 22, on the one hand, and the averaging unit 38, on the other hand.

The device 10 further has a calibration unit 40 by means of which the device 10 can be calibrated on the basis of initial values of the center acquiring unit 18, the radius acquiring unit 20 and/or the shape deviation acquiring unit 22 for future measurements.

Details relating to the function and design of the individual units of the device 10 follow from the above explanations touching on the individual steps of the method that can be carried out by the device 10.

It is then possible to interrogate the output 42 of the device 10 as to the ring radius determined by the radius acquiring unit, the ring center determined by the center acquiring unit, and the ring ellipticity determined by the shape deviation acquiring unit.

Further Possible Embodiments of the Method and/or the Device:

Alternatively, passes of the first step a) up to the fourth step d1) can be repeated multiply (iteratively) on an interference image. In this process, the preceding estimate of the ring center is respectively used in a further iteration as sector origin. This increases the accuracy of the determination of the center.

Alternatively, the first step a) can be executed with mutually overlapping image segments or mutually overlapping image sectors.

The second step b) can, for example, be executed simultaneously (in parallel) on a plurality of sectors, given the use of appropriate parallel hardware.

Alternatively, the second step b) can be executed with the aid of other methods for determining distance (that is to say with the aid of methods differing from the method described in DE 10 2006 030 399 B3).

The second step b) can additionally utilize the information relating to the ring ellipticity $\epsilon$ obtained from an earlier calculation in the fifth step, in order to replace the radial averaging, described in DE 10 2006 030 399 B3, along a circular contour by averaging along the correct elliptical contour. To this end, the phase $\arg(v_2)$ of $v_2$ supplies a measure of the position of the major axis of the ellipse.

Alternatively, in the fourth step and the fifth step use may be made of further Fourier vector components of the first Fourier vector for the calculation.

The information relating to the ring center and obtained in the fifth step can be used to calibrate the system (for example alignment with the center of the image).

The information, obtained in the fifth step, relating to the ring ellipticity $\epsilon$ can be used to calibrate the system (minimization of $\epsilon$).

The method can advantageously be transferred in terms of hardware to cost-effective GPUs (Graphics Processing Units).

In addition to being applied to interferograms, the method can be applied to the general accurate determination of changes in position of objects. To this end, objects whose position is intended to be determined are provided with a ring pattern (for example an interferogram imprint) that can be evaluated in the manner of this invention and observed by a camera, and the camera images are made accessible to the method for evaluation.

What is claimed is:

1. A method for processing an intensity image having a ring structure comprising:
    defining N sectors of the intensity image, the N sectors having respective sector tips lying at a common sector origin within the ring structure, with N being a natural number where N>1;
    detecting a respective distance of an intensity extreme from the respective sector tip of each sector of at least one group of the sectors, in order to obtain a distance vector based on the respective distances for the sectors of the at least one group of sectors;
    performing a Fourier transformation of the distance vector; and
    determining a center of the ring structure based on a first Fourier vector obtained by the Fourier transformation.

2. The method as claimed in claim 1, wherein the defining of N sectors comprises at least one of
    dividing up the intensity image, into N radial image sectors,
    consecutively allocating adjacent sectors a consecutive sector number n, where n=0. . . N−1, and
    in a case of an inexactly known center of the ring structure, defining an approximate ring center as a common sector origin ($cx_0$, $cy_0$) of the radial sectors which forms the respective sector tips.

3. The method as claimed in claim 1, wherein the detecting of a respective distance for each of the respective sectors comprises
    generating a 1-dimensional intensity vector from a 2-dimensional interferogram of the respective sector by 2D-1D transformation, which is selected such that intensity extremes present in the 2-dimensional interferogram appear equidistant in the 1-dimensional intensity vector;

performing a Fourier transformation on the 1-dimensional intensity vector;

determining at least one of a frequency position and a phase angle of a dominant frequency from a second Fourier vector obtained by the Fourier transformation of the 1-dimensional intensity vector; and determining the respective distance of the respective intensity extreme from the sector tip in the sector by back calculation of the frequency position and the phase angle of the dominant frequency of the frequency domain in a spatial domain.

4. The method as claimed in claim 1, wherein
the performing of a Fourier transformation comprises
converting the distance vector $D=(d_0, d_1, \ldots d_{N-1})$ by discrete Fourier transformation into a complex Fourier vector $V=(v_0, v_1, \ldots, v_{N-1})$, the values of the Fourier vector resulting from the values of the distance vector by the definition of the discrete Fourier transform as:

$$v_k = \frac{1}{N}\sum_{n=0}^{N-1} d_n e^{-i2\pi k \frac{n}{N}}$$

where $k=0 \ldots N-1$, an N represents the number of the sectors.

5. The method as claimed in claim 4, wherein the determining of the center of the ring structure comprises
determining the position of the ring center from the component $v_1$ of the first Fourier vector.

6. The method as claimed in claim 4, wherein the determining of the center of the ring structure comprises
determining coordinates cx, cy of the ring center according to equations:

$cx=cx_0+2Re(v_1)$ and $cy=cy_0+2Im(v_1)$, where
$cx_0, cy_0$ represent coordinates of a common sector origin defined by the defining of N sectors,
$Re(v_1)$ represents a real part of the complex number $v_1$, and $Im(v_1)$ represents an imaginary part of the complex number $v_1$.

7. The method as claimed in claim 4, wherein
the determining of the center of the ring structure comprises determining a ring radius of the ring structure from the Fourier vector component $v_0$, or from the Fourier vector component $v_0$ and at least one of the Fourier vector components $v_1$ and $v_2$.

8. The method as claimed in claim 7, further comprising
determining a mean radius from an absolute value $|v_0|$ of the Fourier vector component $v_0$, and correcting the mean radius according to at least one of further Fourier vector components.

9. The method as claimed in claim 7, wherein
the ring radius of the ring structure is calculated from the Fourier vector components $v_0$, $v_1$ and $v_2$ according to a relationship:

$$R(v_0, v_1, v_2) = |v_0| \cdot \left(1 + \left(\frac{|v_1|}{|v_0|}\right)^2 + \left(\frac{|v_2|}{|v_0|}\right)^2\right).$$

10. The method as claimed in claim 1, further comprising
determining at least one of ring radii, ring centers and ring ellipticities in a Fabry-Perot interferometer based on at least one of the determined center of the ring structure, radius of the ring structure and deviation of the ring structure from a circular shape.

11. The method as claimed in claim 1, further comprising
repeating the defining, detecting, performing and determining with the determined center of the ring structure being used as the common sector origin for the sectors.

12. The method as claimed in claim 1, wherein
the defining of N sectors defines the sectors as mutually overlapping sectors.

13. The method as claimed in claim 1, wherein
the detecting of a respective distance is performed simultaneously in a plurality of the sectors.

14. The method as claimed in claim 1, wherein
the detecting of a respective distance comprises averaging intensity values acquired along a specific circular contour with a prescribed radius $R_L$ or a specific elliptical contour with prescribed ellipse semi-axis lengths.

15. The method as claimed in claim 1, further comprising
calibrating an image processing device based on at least one of the determined position of the ring center and ellipticity of the ring structure.

16. The method as claimed in claim 1, further comprising
determining at least one of the following based on the determined at least one of the center of the ring structure, radius of the ring structure and deviation of the ring structure from a circular shape:
a change in length or wavelength,
gusts pertaining to an aircraft, and
a change in position of an object provided with a ring pattern, the ring pattern being recorded as an image and being subjected to corresponding image processing in order to acquire the position of the ring pattern, and thus the position of the object.

17. The method of claim 1, wherein the determining further comprises determining at least one of
a radius of the ring structure; and
a deviation of the ring structure from a circular shape, based on the first Fourier vector obtained by the Fourier transformation.

18. The method as claimed in claim 17, wherein
the determining comprises determining an ellipticity of the ring structure based on at least one component of the first Fourier vector.

19. The method as claimed in claim 18, wherein
the ellipticity is calculated based on the Fourier vector component $v_2$ in the form of the numerical ellipticity $\epsilon$ according to a relationship $$\varepsilon = 2\sqrt{2\frac{|v_2|}{|v_0|}}.$$

20. The method as claimed in claim 17, further comprising
repeating the defining, detecting, performing and determining with the determined ellipticity of the ring structure being used as a starting point for averaging the intensity values along the specific circular or elliptical contour.

21. An apparatus for processing an intensity image having a ring structure, comprising:
a sector forming component configured to define N sectors of the intensity image, the N sectors having respective sector tips lying at a common sector origin within the ring structure, with N being a natural number where N>1;

a distance acquiring component configured to acquire a respective distance of an intensity extreme from the respective sector tip of each sector of at least one group of the sectors, in order to obtain a distance vector based on the respective distances for the sectors of the at least one group of sectors;

a first Fourier transformation component configured to perform a Fourier transformation of the distance vector to obtain a first Fourier vector; and a center acquiring component configured to determine a center of the ring structure from the first Fourier vector obtained by the Fourier transformation.

22. The apparatus as claimed in claim 21, wherein the sector forming component comprises at least one of the following:

a dividing component configured to divide up a given intensity image, into N radial image sectors, an allocating component configured to consecutively allocate to adjacent sectors a consecutive sector number n, where n=0. . . N-1 and a ring center selecting component configured to define an approximate ring center as a common sector origin ($cx_0$, $cy_0$) of the radial sectors, which forms the respective sector tips when the center of the ring structure is inexactly known.

23. The apparatus as claimed in claim 21, wherein the distance acquiring component includes:

an intensity vector generating component configured to generate a 1-dimensional intensity vector from a 2-dimensional interferogram of the respective sector by 2D-1D transformation, which is selected such that intensity extremes present in the 2-dimensional interferogram appear equidistant in the 1-dimensional intensity vector;

a second Fourier transformation component configured to perform a Fourier transformation on the 1-dimensional intensity vector to generate a second Fourier vector;

a determining component configured to determine at least one of a frequency position and phase angle of dominant frequency from the second Fourier vector obtained by the Fourier transformation of the 1-dimensional intensity vector; and a distance determining component configured to determine the respective distance of the respective intensity extreme from the sector tip in the sector by back calculation of the frequency position and the phase angle of the dominant frequency of the frequency domain in a spatial domain.

24. The apparatus as claimed in claim 21, wherein the first Fourier transformation component is configured to convert the distance vector $D=(d_0, d_1, \ldots, d_{N-1})$ by discrete Fourier transformation into a complex Fourier vector $V=(v_0, v_1, \ldots, v_{N-1})$, the values of the Fourier vector resulting from the values of the distance vector by the definition of the discrete Fourier transform as:

$$v_k = \frac{1}{N}\sum_{n=0}^{N-1} d_n e^{-i2\pi k \frac{n}{N}}$$

where k=0. . . N-1, and N represents the number of the sectors.

25. The apparatus as claimed in claim 24, wherein the center acquiring component is configured to determine the position of the ring center from the component $v_1$ of the first Fourier vector.

26. The apparatus as claimed in claim 24, wherein the center acquiring component is configured to determine the coordinates cx, cy of the ring center according to equations:

$$cx = cx_0 + 2Re(v_1) \text{ and}$$

$$cy = cy_0 + 2Im(v_1),$$

where $cx_0$, $cy_0$ represent coordinates of the common sector origin, $Re(v_1)$ represents a real part of the complex number $v_1$, and $Im(v_1)$ represents an imaginary part of the complex number $v_1$.

27. The apparatus as claimed in claim 21, wherein at least one of the center acquiring component, a radius acquiring component and a shape deviation acquiring component are configured to calculate at least one of ring radii, ring centers and ring ellipticities in a Fabry-Perot interferometer based on at least one of the determined center of the ring structure, radius of the ring structure and deviation of the ring structure from a circular shape.

28. The apparatus as claimed in claim 21, wherein the sector forming component is configured to use the determined center of the ring structure as the common sector origin for the sectors when repeating an operation to again define the sectors.

29. The apparatus as claimed in claim 21, wherein the sector forming component is configured to define the sectors as mutually overlapping sectors.

30. The apparatus as claimed in claim 21, further comprising a plurality of the distance acquiring components that are configured to simultaneously acquire respective distances of a intensity extremes from the respective sector tips of the respective sectors.

31. The apparatus as claimed in claims 21, wherein the distance acquiring component includes an averaging component that is configured to average intensity values acquired along a specific circular contour with a prescribed radius $R_L$ or specific elliptical contour with prescribed ellipse semi-axis lengths.

32. The apparatus as claimed in claim 31, wherein the averaging component is configured to use a previously acquired position and shape of the ring structure as a starting point for averaging along the correct circular or elliptical contour.

33. The apparatus as claimed in claim 21, further comprising a calibration component configured to calibrate the apparatus based on initial values obtained by at least one of the center acquiring component, a radius acquiring component and a shape deviation acquiring component.

34. The apparatus as claimed in claim 21, wherein the at least one of the center acquiring component, the radius acquiring component and the shape deviation acquiring component are configured to determine at least one of the following based on the determined at least one of the center of the ring structure, radius of the ring structure and deviation of the ring structure from a circular shape:

a change in length or wavelength, gusts pertaining to an aircraft, and a change in position of an object provided with a ring pattern, the ring pattern being recorded as an image and being subjected to corresponding image processing in order to acquire the position of the ring pattern, and thus the position of the object.

35. The apparatus of claim 21, further comprising at least one of a radius acquiring component configured to determine a radius of the ring structure from the first Fourier vector obtained by the Fourier transformation, and a shape deviation acquiring component configured to acquire a deviation of the ring structure from a circular shape based on the first Fourier vector acquired by the Fourier transformation.

36. The apparatus as claimed in claim 35, wherein the radius acquiring component is configured to determine a ring radius of the ring structure from the Fourier vector component $v_0$, or from the Fourier vector component $v_0$ and at least one of the Fourier vector components $v_1$ and $v_2$.

37. The apparatus as claimed in claim 36, wherein the radius acquiring component is configured to determine a mean radius from an absolute value $|v_0|$ of the Fourier vector component $v_0$, and to determine the radius by correcting the mean radius by according to at least one of further Fourier vector components.

38. The apparatus as claimed in claim 36, wherein the radius acquiring component is configured to calculate the radius of the ring structure from the Fourier vector components $v_0$, $v_1$ and $v_2$ according to a relationship:

$$R(v_0, v_1, v_2) = |v_0| \cdot \left(1 + \left(\frac{|v_1|}{|v_0|}\right)^2 + \left(\frac{|v_2|}{|v_0|}\right)^2\right).$$

39. The apparatus as claimed in claim 35, wherein the shape deviation acquiring component is configured to determine an ellipticity of the ring structure based on at least one component of the first Fourier vector.

40. The apparatus as claimed in claim 39, wherein the shape deviation acquiring component is configured to calculate the ellipticity from the Fourier vector component $v_2$ as a numerical ellipticity $\epsilon$ according to a reslationship $$\epsilon = 2\sqrt{2\frac{|v_2|}{|v_0|}}.$$

* * * * *